United States Patent
King et al.

(10) Patent No.: US 10,695,944 B2
(45) Date of Patent: Jun. 30, 2020

(54) TREATED POROUS MATERIAL

(71) Applicant: Dow Global Technologies LLC, Midland, MI (US)

(72) Inventors: Stephen W. King, League City, TX (US); Xue Chen, Manvel, TX (US)

(73) Assignee: Dow Global Technologies LLC, Midland, MI (US)

(*) Notice: Subject to any disclaimer, the term of this patent is extended or adjusted under 35 U.S.C. 154(b) by 296 days.

(21) Appl. No.: 15/315,236

(22) PCT Filed: Jun. 30, 2015

(86) PCT No.: PCT/US2015/038477
§ 371 (c)(1),
(2) Date: Nov. 30, 2016

(87) PCT Pub. No.: WO2016/003999
PCT Pub. Date: Jan. 7, 2016

(65) Prior Publication Data
US 2017/0113373 A1    Apr. 27, 2017

Related U.S. Application Data

(60) Provisional application No. 62/018,951, filed on Jun. 30, 2014.

(51) Int. Cl.
*B27K 3/36* (2006.01)
*B27K 3/15* (2006.01)
*C09D 123/08* (2006.01)
*B27K 3/02* (2006.01)
*B27K 3/08* (2006.01)
*C08L 33/08* (2006.01)
*C08L 33/02* (2006.01)
*C08L 23/08* (2006.01)
*C08L 33/10* (2006.01)

(52) U.S. Cl.
CPC .............. *B27K 3/36* (2013.01); *B27K 3/0278* (2013.01); *B27K 3/08* (2013.01); *B27K 3/153* (2013.01); *B27K 3/156* (2013.01); *C09D 123/0869* (2013.01); *B27K 2240/30* (2013.01); *B27K 2240/70* (2013.01); *B27K 2240/90* (2013.01); *C08L 23/0853* (2013.01); *C08L 23/0869* (2013.01); *C08L 23/0876* (2013.01); *C08L 33/02* (2013.01); *C08L 33/08* (2013.01); *C08L 33/10* (2013.01); *C08L 2201/54* (2013.01)

(58) Field of Classification Search
None
See application file for complete search history.

(56) References Cited

U.S. PATENT DOCUMENTS

| | | | |
|---|---|---|---|
| 3,077,420 A | 2/1963 | Kenaga | |
| 5,273,787 A | 12/1993 | Gnatowski | |
| 6,482,886 B1 | 11/2002 | Finlayson et al. | |
| 8,173,726 B2 | 5/2012 | Heuts et al. | |
| 2003/0121445 A1* | 7/2003 | Herbert, Jr. | B27K 3/15 106/16 |
| 2007/0122558 A1* | 5/2007 | Gibiat | B27K 3/15 427/393 |
| 2008/0020087 A1 | 1/2008 | Landers | |
| 2009/0158961 A1* | 6/2009 | Zhang | A01N 43/42 106/18 |
| 2009/0317626 A1 | 12/2009 | Tiarks et al. | |
| 2010/0092782 A1 | 4/2010 | Perrier et al. | |

FOREIGN PATENT DOCUMENTS

| | | |
|---|---|---|
| CN | 1207786 A | 2/1999 |
| EP | 1950261 | 7/2008 |
| WO | 1994011122 | 5/1994 |
| WO | 2009047551 | 4/2009 |
| WO | 2013043363 A2 | 3/2013 |
| WO | 2014004358 A2 | 1/2014 |

OTHER PUBLICATIONS

"OUDRASperse(TM) WB 3001—Waterborne Epoxy Dispersion," Technical Data Sheet, p. 1-5, Dow Maintenance & Protective Coatings.

* cited by examiner

*Primary Examiner* — Michael P. Rodriguez
(74) *Attorney, Agent, or Firm* — James T. Hoppe

(57) ABSTRACT

The present disclosure describes a treated cellulosic material comprising a cellulosic material having a porous structure defining a plurality of pores, at least a portion of the pores containing a treating agent comprising a polymer comprising an olefin-carboxylic acid copolymer; and a modifying agent comprising an epoxy.

9 Claims, No Drawings

TREATED POROUS MATERIAL

BACKGROUND OF THE INVENTION

Porous materials, such as cellulosic materials, need to be protected from mold growth, insect attack, rot and water impregnation to help preserve the physical properties of the cellulosic material. One example of such a cellulosic material is wood. A variety of treatment agents and preservation methods are known to preserve cellulosic materials.

Modern preservation methods typically involve pressure treating the cellulosic material with a treating agent. Pressure treatment typically allows the treating agent to penetrate throughout the porous structure of the cellulosic material. The treating agent is typically a chemical compound selected to impart the desired physical properties to the cellulosic material. For example, treating agents that increase hardness, add water resistance and improve the dimensional stability of the cellulosic material are of interest. Wood is capable of absorbing as much as 100% of its weight in water which causes the wood to swell, which after loss of water through evaporation causes the wood to shrink. This process of water absorption/evaporation is non-uniform and creates internal stresses in the wood leading to splitting, warping, bowing, crooking, twisting, cupping, etc. Also, water can serve as a pathway for organisms that degrade the cellulosic material, such as insects or fungus.

Termites are one of the most significant insect groups responsible for wood damage. In order to mitigate termite damage, the use of naturally durable wood species, preservative treatments, and engineered wood products have been employed. However, the need for improved technologies for termite resistance are desirable due to the limited availability of durable woods, the high percentage weight gains required for preservatives to provide efficacy, and the "unnatural" look of engineered wood. A technology which is provides termite resistance and dimensional stability to wood is highly desirable.

Treating agents that repel insects, or minimize the formation of fungi/molds, or improve the overall durability of the cellulosic material are of interest. Further, treating agents can improve wind resistance, ultraviolet radiation resistance, stability at high and low temperatures, pest resistance, mold resistance, fire resistance and other issues which might affect the physical properties of the cellulosic material.

An improved treating agent for cellulosic materials is desired.

SUMMARY OF THE INVENTION

The present disclosure describes a treated cellulosic material comprising a cellulosic material having a porous structure defining a plurality of pores, at least a portion of the pores containing a treating agent comprising a polymer comprising an olefin-carboxylic acid copolymer; and a modifying agent comprising an epoxy.

The present disclosure further describes A method for preparing a treated cellulosic material comprising providing a cellulosic material; a first treatment protocol comprising impregnating the cellulosic material with a modifying agent, the modifying agent comprising an epoxy resin; and a second treatment protocol comprising impregnating the cellulosic material with an aqueous dispersion comprising a polymer, the polymer comprising an olefin-carboxylic acid copolymer.

DETAILED DESCRIPTION OF THE INVENTION

As used herein, the term "porous material" refers to a material which is permeable such that fluids are movable therethrough by way of pores or other passages. An example of a porous material is a cellulosic material. Other examples of porous materials include stone, concrete, ceramics, and derivatives thereof. As used herein, the term "cellulosic material" refers to a material that includes cellulose as a structural component. Examples of cellulosic materials include wood, paper, textiles, rope, particleboard and other biologic and synthetic materials. As used herein, wood includes solid wood and all wood composite materials (e.g., chipboard, engineered wood products, etc.). Cellulosic materials generally have a porous structure that defines a plurality of pores.

A "treated cellulosic material" is a cellulosic material that has been treated with a treating agent to modify the properties of the cellulosic material. The properties modified by the treating agent include, but are not limited to, increased hydrophobicity, dimensional stability, fungi resistance, mold resistance, insect resistance, hardness, surface appearance, UV stability, fire resistance, and coatability. Increasing the hydrophobicity of a cellulosic material can provide other ancillary benefits, such as dimensional stability, by reducing the rate of water adsorption and evaporation, thus reducing the internal stresses of expanding and contracting.

A "treating agent" is a substance that, when combined with the cellulosic material, modifies the properties of the cellulosic material. In one instance, the treating agent comprises both a polymer and a modifying agent. The treating agent is applied to the cellulosic material. One method of applying the treating agent to the cellulosic material is through impregnation using pressure treatment. In one instance, the polymer is applied to the cellulosic material as part of an aqueous dispersion. Other methods of applying the treating agent are known, such as brushing, coating, spraying, dipping, soaking and extrusion. Once applied, the treating agent will permeate at least a portion of the pores of the cellulosic material.

As used herein, polymer refers to a molecule that is formed from one or more types of monomers. The polymer is preferably a copolymer or a mixture of copolymers and polymers. As used herein, copolymer may refer to an alternating copolymer, a periodic copolymer, a statistical copolymer, a random copolymer, a block copolymer, a graft copolymer, or other copolymer as is known. As used herein, copolymer refers to a polymer formed by uniting two or more monomers. Examples of copolymers include bipolymers, terpolymers, tetrapolymers, and other higher-ordered copolymers. In one instance, the polymer comprises an olefin-carboxylic acid copolymer. In one instance, the olefin-carboxylic acid copolymer comprises, in polymerized form, a monomer selected from the group comprising ethylene, propylene, 1-butene, 3-methyl-1-butene, 4-methyl-1-pentene, 3-methyl-1-pentene, 1-heptene, 1-hexene, 1-octene, 1-decene, 1-dodecene, butadiene, styrene, (meth) acrylic acid, maleic acid, maleic anhydride, or a mixture thereof. In one instance, a styrene acrylic acid dispersion is suitable, for example, Orotan™ CA-2005, commercially available from The Dow Chemical Company. Other suitable polymers and/or copolymers present in the mixture include elastomers, plastics and fibers.

In certain embodiments, the polymer comprises a polar olefin polymer, having a polar group as either a comonomer or grafted monomer. As used herein, a polar olefin polymer is an olefin (co)polymer which contains one or more polar groups. In exemplary embodiments, the polymer may, for example, comprise one or more polar polyolefins, having a polar group as either a comonomer or grafted monomer. Examples of polar groups include carboxylic acids, carboxylic acid anhydrides, carboxylic acid esters, carboxylic acid salts, and carboxylic acid amides. Exemplary polar polyolefins include, but are not limited to, ethylene/acrylic acid (EAA) and ethylene/methacrylic acid (EMAA) copolymers, such as those available under the trademarks PRIMACOR™, commercially available from The Dow Chemical Company, NUCREL™, commercially available from E.I. DuPont de Nemours, and ESCOR™, commercially available from ExxonMobil Chemical Company. Exemplary copolymers also include ethylene/maleic anhydride copolymer, such as those available from The Dow Chemical Company under the trademark AMPLIFY™ GR. Exemplary copolymers further include ethylene/maleic anhydride and propylene/maleic anhydride copolymers, such as those available from Clariant International Ltd. under the trademark LICOCENE™. Other exemplary base polymers include, but are not limited to, ethylene/vinyl acetate copolymer, ethylene/ethyl acrylate (EEA) copolymer, ethylene/methyl methacrylate (EMMA) copolymer, and ethylene butyl acrylate (EBA) copolymer.

Other olefin-carboxylic acid copolymers may also be used as the polymer. Copolymers which have ester or anhydride functionalities can be converted to carboxylic acids or the polymer could also be derived by chemical modification of functional carboxylic acid salts by methods known to one skilled in the art. The polymer can also be modified to form other functional groups such as esters or amides and the like. Those having ordinary skill in the art will recognize that a number of other useful polymers may also be used.

In one embodiment, the base polymer may, for example, comprise a polar polyolefin selected from the group consisting of ethylene/acrylic acid (EAA) copolymer, ethylene/methacrylic acid copolymer (EMAA), and combinations thereof. In one instance, the polymer comprises ethylene/(meth)acrylic acid copolymer either alone, or in a mixture with other polymers or copolymers.

As used herein, the use of the term "(meth)" followed by another term such as acrylate refers to both acrylates and methacrylates. For example, the term "(meth)acrylate" refers to either acrylate or methacrylate; the term "(meth)acrylic" refers to either acrylic or methacrylic; and the term "(meth)acrylic acid" refers to either acrylic acid or methacrylic acid. The term "(co)polymer" refers to both polymers and copolymers.

In one instance, the polymer is a constituent part of an aqueous dispersion (referred to herein as an aqueous dispersion or an aqueous polymer dispersion). In one instance, the aqueous dispersion is a medium that comprises the polymer, water and one or more organic solvents. The aqueous dispersion is prepared such that the suspended particle size in the dispersion is suitable for penetrating the pores of the cellulosic material for distribution through the cellulosic material. In one instance, the aqueous dispersion also comprises one or more additives. In one instance, any solids present in the aqueous dispersion are held in a stable suspension and are transportable by the aqueous dispersion into the pores of the cellulosic material. In one instance, the solid content of the aqueous dispersion is 1 to 75 weight percent. In one instance the organic solvent is an oxygenated solvent, a hydrocarbon solvent, a halogenated solvent, or a combination thereof.

The carboxylic acid portion of the polymer is neutralized with a neutralizing agent at least in part to form a stable aqueous dispersion. As used herein, a neutralizing agent is any material in which the reaction with the carboxylic acid can potentially result in the formation of a salt. In one instance the neutralizing agent is selected from the the hydroxides of alkali metals, ammonia or organic derivatives thereof (including amines). In one instance the neutralizing agent is a strong base or a weak base. For example, the neutralizing agent may be sodium hydroxide, potassium hydroxide, or ammonia or an amine, such as monoethanolamine (MEA), triethanolamine (TEA), diethylethanolaminediethylethanolamine (DEEA) or dimethylaminoethanol (DMEA). AQUACER™ 8804, available from BYK USA Inc., is an example of a neutralized EAA dispersion. A stable dispersion is a dispersion that is suitable for penetrating the pores of the cellulosic material. The neutralizing agent neutralizes at least a portion of the carboxylic acid groups of the polymer. As used herein, neutralization of the carboxylic acid groups refers to any reaction in which the hydrogen of the carboxylic acid group is transferred. In one instance, 5 to 100 mole percent of the carboxylic acid groups of the polymer are neutralized by the neutralizing agent. In another instance 10 to 80 mole percent of the carboxylic acid groups are neutralized by the neutralizing agent. In still another instance 20 to 70 mole percent of the carboxylic acid groups are neutralized by the neutralizing agent.

The modifying agent is a substance that, when combined with the polymer and impregnated in the cellulosic material, improves the properties of the cellulosic material. In one instance, the modifying agent is an epoxy resin. In one instance, the epoxy resin is provided as a liquid in a solution with one or more solvents. In another instance the epoxy resin is provided as a solid suspended in a dispersion (referred to herein as an epoxy dispersion). Suitable modifying agents include 2,2-Bis(p-(2,3-epoxypropoxy)phenyl) propane and Bisphenol A diglycidyl ether. The epoxy dispersion is prepared such that the suspended particle size in the dispersion is suitable for penetrating the pores of the cellulosic material for distribution through the cellulosic material.

Epoxy resins are those compounds containing at least one vicinal epoxy group. The epoxy resin may be saturated or unsaturated, aliphatic, cycloaliphatic, aromatic or heterocyclic. The epoxy resin may be substituted. The epoxy resin may also be monomeric or polymeric. The epoxy resin useful in the present invention may be selected from any known epoxy resins in the art.

Examples of suitable epoxy resins include, but are not limited to, polyglycidyl ethers of polyhydric alcohols, polyglycidyl ethers of polyhydric phenols, polyglycidyl amines, polyglycidyl amides, polyglycidyl imides, polyglycidyl hydantoins, polyglycidyl thioethers, epoxidized fatty acids, epoxidized drying oils, epoxidized polyolefins, epoxidized di-unsaturated acid esters, epoxidized unsaturated polyesters, and mixtures thereof.

Particularly suitable epoxy resins are based on reaction products of polyfunctional alcohols, phenols, cycloaliphatic carboxylic acids, aromatic amines, or aminophenols with epichlorohydrin. A few non-limiting embodiments include, for example, bisphenol A diglycidyl ether, bisphenol F diglycidyl ether, resorcinol diglycidyl ether, and triglycidyl ethers of para-aminophenols. Other suitable epoxy resins include reaction products of epichlorohydrin with o-cresol and, respectively, phenol novolacs. It is also possible to use a mixture of two or more epoxy resins.

The epoxy resins, used in embodiments disclosed herein of the present invention, may vary and include conventional and commercially available epoxy resins, which may be used alone or in combinations of two or more. In one instance, the epoxy resin is a liquid epoxy resin, for example, D.E.R. 330, D.E.R. 331, D.E.R. 332, D.E.R. 324, D.E.R. 334, D.E.R. 354. D.E.R. 383, D.E.R. 580, D.E.N. 431, D.E.N. 438, D.E.R. 736, or D.E.R. 732 epoxy resins available from The Dow Chemical Company may be used. In one instance, the modifying agent is a waterborne dispersion of a solid or a liquid epoxy resin, for example, those available under the trademark OUDRASperse™, commercially available from The Dow Chemical Company, e.g., OUDRASperse™ WB 3001, OUDRASperse™ WB 4001, OUDRASperse™ WB 6001, may be used. Mixtures of epoxy resins may also be used.

In one instance, the epoxy resin useful in the composition of the present invention comprises any aromatic or aliphatic glycidyl ether or glycidyl amine or a cycloaliphatic epoxy resin. However, diglycidyl ether of bisphenol A and derivatives thereof are particularly preferred. Other epoxy resins can be selected from, but limited to, the groups of: bisphenol F epoxy resins, novolac epoxy resins, glycidylamine-based epoxy resins, alicyclic epoxy resins, linear aliphatic epoxy resins, tetrabromobisphenol A epoxy resins, and combinations thereof.

The treating agent is combined with the cellulosic material. In one instance, the treating agent is introduced to the cellulosic material by pressure treatment, as described herein. In another instance, the treating agent is introduced to the cellulosic material by other techniques known in the art, for example, brushing, coating, dipping, soaking, spraying, and extrusion. The treating agent becomes impregnated in at least a portion of the pores of the cellulosic material, and thereby increases the weight of the cellulosic material. In one instance, the polymer increases the weight of the cellulosic material by 1 to 80 percent (as calculated after drying the cellulosic material). In one instance, the treating agent—the combination of the polymer and the modifying agent—increases the weight of the cellulosic material by 5 to greater than 100 percent (as calculated after drying the cellulosic material).

In one instance, the treating agent comprises one or more additives. The additive may be included as part of the aqueous dispersion, as part of the modifying agent, or may be included separately therefrom. Additives which are known to add properties to treated cellulosic materials are suitable, such as, flame retardants, dispersants and/or dyes. For example, the additives may be organic compounds, metallic compounds, or organometallic compounds. In one instance, the additive is a material which improves the wetting or penetration of the polymer into the wood, for example, solvents or surfactants (anionic, cationic or nonionic) that are stable in the aqueous dispersion. Examples of additives include, solvents, fillers, thickeners, emulsifiers, dispersing agents, buffers, pigments, penetrants, antistatic agents, odor substances, corrosion inhibitors, preservatives, siliconizing agents, rheology modifiers, anti-settling agents, anti-oxidants, other crosslinkers (e.g. diols and polyols), optical brighteners, waxes, coalescence agents, biocides and anti-foaming agents. Such waxes may include petroleum waxes, paraffin waxes, a natural wax, or a synthetic wax such as polyethylene wax or oxidized polyethylene wax, beeswax, or slack wax. Further, the additive may comprise one or more epoxy curing agents, for example, amines, ketimines, polyaminoamines, mercaptans, anhydrides, Lewis acids, sulfones or phenols. In addition, the treating agent may be used in conjunction with wood preservatives containing, for example, cupric-ammonia, cupric-amine, cupric-ammonia-amine complexes, quaternary ammonium compounds, or other systems. For example, the treating agent may be used with Alkaline Copper-Quaternary ammonium (ACQ) preservative systems. The treating agent may also be used with wood preservative technologies which use zinc salts or boron containing compounds. Optionally, other additives such as insecticides, termiticides, fungicides, and moldicides may be added to the treating agent. In one instance, the additive is included as part of the aqueous or epoxy dispersion and forms a stable suspension therewith. In one instance, one or more surfactant is added to the aqueous or epoxy dispersion. In one instance, a surfactant is selected which reduces gelling of the polymer at the surface of the cellulosic material. In one instance, a surfactant is selected which increases the amount of polymer impregnated in the cellulosic material. For example, suitable surfactants may be nonionic, anionic, or cationic. Examples of nonionic surfactants include: alkoxylated alcohols, alkoxylated alkyl phenols, fatty acid esters, amine and amide derivatives, alkylpolyglucosides, ethylene oxide/propylene oxide copolymers, polyols and alkoxylated polyols. For example, a nonionic surfactant is TERGITOL™ L-62, commercially available from The Dow Chemical Company. Examples of anionic surfactants include: alkyl sulfates, alkyether sulfates, sulfated alkanolamides, alpha olefin sulfonates, lignosulfonates, sulfosuccinates, fatty acid salts, and phosphate esters. For example, an anionic surfactant is DOWFAX™ C10L, commercially available from the Dow Chemical Company. Examples of cationic surfactants include alkyltrimethylammonium salts.

Curing agents are known which polymerize epoxy resins. The curing agents preferably at least partially polymerize the epoxy resin. As used herein, epoxy refers to cured, uncured, or a mixture of cured and uncured epoxy resin. In one instance, heat may be applied to increase the curing rate of the epoxy resin following impregnation in the cellulosic material. Curing rate is proportional to temperature. In one instance, suitable curing temperatures are from room temperature to 180° C. In one instance, the neutralizing agent used in the aqueous dispersion may also serve as a curing agent for the epoxy resin. Where the aqueous dispersion and the epoxy dispersion are combined prior to impregnation in the cellulosic material (referred to herein as a treating agent dispersion), care needs to be taken to minimize the amount of curing prior to impregnation. Techniques for delaying curing are known in the art, for example, lowering the temperature of the treating agent dispersion, and/or shortening the time between preparing the treating agent dispersion and impregnating the wood. In one instance, it was found that a 1:1 (by weight) mixture of the polymer dispersion and the epoxy dispersion begins to cure (is not stable) at 45° C. 24 hours after mixing.

In one instance, the cellulosic material is prepared as a treated cellulosic material by pressure treatment. The pressure used to pressure treat the cellulosic material may be either higher or lower than atmospheric pressure. In one instance, the pressure is lower than ambient pressure, for example, 0.0001 to 0.09 MPa (0.75 to 675 mmHg). In another instance, the pressure is greater than ambient pressure, for example, 0.1 to 1.7 MPa (750 to 12750 mmHg). It is envisioned that pressure treatment processes known in the art are suitable for impregnating the cellulosic material with the treating agent.

In one instance, the treated cellulosic material is prepared according to at least a first treatment protocol and a second treatment protocol.

In one instance, the first treatment protocol comprises impregnating the cellulosic material with the modifying agent. The first treatment protocol comprises one or more of the following steps: (a) depositing the cellulosic material in a vessel; (b) introducing the modifying agent to the vessel; (c) holding the vessel at either vacuum or increased pressure for 5 to 60 minutes; (d) optionally removing excess modifying agent by vacuum; and (e) air drying the cellulosic material at 60° C. for 24 to 48 hours. In one instance, the modifying agent comprises an epoxy dispersion.

In one instance, the second treatment protocol comprises impregnating the cellulosic material with the polymer. The second treatment protocol comprises one or more of the following steps: (a) depositing the cellulosic material in a vessel; (b) holding the vessel at vacuum for 5 to 60 minutes; (c) introducing the polymer to the vessel; (d) pressurizing the vessel to 1.03 MPa for 5 to 60 minutes; (e) draining the excess polymer; (f) optionally removing excess polymer by vacuum; and (g) air drying the cellulosic material at 20 to 60° C. for 24 to 48 hours. In one instance, the polymer is part of the aqueous dispersion.

In one instance, the second treatment protocol is administered prior to the first treatment protocol, such that the cellulosic material is first impregnated with the polymer and is second impregnated with the modifying agent. In one instance, the first treatment protocol is administered prior to the second treatment protocol, such that the cellulosic material is first impregnated with the modifying agent and is second impregnated with the polymer. In a further instance, the cellulosic material is impregnated with the polymer and the modifying agent simultaneously according to one or more of the following steps: (a) depositing the cellulosic material in a vessel; (b) holding the vessel at vacuum for 5 to 60 minutes; (c) introducing the polymer and the modifying agent to the vessel; (d) pressurizing the vessel to 1.03 MPa for 5 to 60 minutes; (e) draining the excess polymer and modifying agent; (f) optionally removing excess polymer and modifying agent by vacuum; and (g) air drying the cellulosic material at 20 to 60° C. for 24 to 48 hours. In instances where the first treatment protocol and the second treatment protocol are administered simultaneously, the aqueous polymer dispersion may optionally be pre-mixed with the epoxy dispersion to prepare a treating agent dispersion.

The several drying steps may be performed at a range of temperatures, whereby the duration of the air drying step is proportional to the temperature. Suitable air-drying temperatures are between room temperature (roughly 20° C.) and 180° C. The drying may be performed in air, in nitrogen, or other suitable atmosphere.

A water immersion test is used to determine the water repellency of the treated cellulosic material according to the American Wood Protection Association Standard E4-11 procedure (Standard Method of Testing Water Repellency of Pressure Treated Wood). The water immersion test involves first, providing both a treated wafer, comprising a treated cellulosic material prepared as described herein, and a control wafer, comprising a cellulosic material treated according to the second treatment protocol described herein except that the aqueous dispersion is replaced by distilled water; second, measuring the tangential dimension of both the treated wafer and the control wafer to provide an initial tangential dimension ($T_1$) (where the tangential dimension is perpendicular to the direction of the grain of the cellulosic material); third, placing both the treated wafer and the control wafer in a conditioning chamber maintained at 65±3% relative humidity and 21±3° C. until a constant weight is achieved; fourth, immersing both the treated wafer and the control wafer in distilled water at 24±3° C. for 30 minutes; and fourth, measuring the tangential dimension of both the treated wafer and the control wafer following removal from the water to provide a post tangential dimension ($T_2$).

DoN refers to the degree of neutralization of the carboxylic acid functionality in the polymer.

The percent swelling (S) for each individual wafer (both the treated wafer and the control wafer) is calculated as:

$$S(\%) = \frac{T_2 - T_1}{T_1} \times 100$$

In each of the Examples herein, the percent swelling of the control wafer is 4.7%.

Water-repellency efficiency (WRE) is used to determine the effectiveness of the treating agent in adding water repellant properties to the treated cellulosic material. WRE is calculated as:

$$WRE(\%) = \frac{S_2 - S_1}{S_1} \times 100$$

$S_1$ refers to the percent swelling of the untreated wafer; $S_2$ refers to the percent swelling of the treated wafer. According to E4-11, for most outdoor applications a minimum WRE of 75% is preferred. The WRE of raw wood without any treatment is 0%.

The hardness of the treated cellulosic material is determined according to the Shore (Durometer) test using a Type D Durometer (30° cone, 1.40 mm diameter, 2.54 mm extension, 44.48 N spring force). Hardness is determined using the Type D Durometer by placing the cellulosic material on a hard flat surface, and the foot of the durometer is pressed with the given spring force against the cellulosic material. The hardness value is recorded from the gauge on the Durometer within one second of contact with the cellulosic material. At least five hardness tests were performed per sample of cellulosic material. Hardness values reported herein are averages of the tests performed for a given cellulosic material. The hardness value of an untreated wafer is 40.

The following Examples illustrate certain aspects of the present disclosure, but the scope of the present disclosure is not limited to the following Examples.

Example 1

A pine wafer (southern yellow pine, 4 cm×2 cm×0.5 cm) is held at the bottom of a Parr reactor by a weight (here a ring is used). The reactor pressure is set to vacuum for 30 minutes. An aqueous polymer dispersion is prepared comprising 20 percent by weight PRIMACOR™ 5980 (60% DoN with MEA, 8.4 pH, particle size of 74 nm) and 80 percent by weight water. An epoxy dispersion (OUDRASperse™ WB 3001 manufactured by The Dow Chemical Company) is prepared comprising 60 percent by weight dispersion solid and 40 percent by weight water. 80 ml of a dispersion comprising 50 percent by weight aqueous polymer dispersion and 50 percent by weight epoxy dispersion is introduced to the reactor. The reactor pressure is then set to 1.03 MPa for 60 minutes under nitrogen. The wafer is then placed in an oven and air dried at 60° C. for 2 weeks, thereby providing a treated wafer. The treated wafer and the control wafer are each processed according to the E4-11 procedure. The percent swelling for the treated wafer is 1.6%; the WRE of the treated wafer is 65%. The hardness of the treated wafer is measured as 56 using a Type D Durometer.

Example 2

A pine wafer (southern yellow pine, 4 cm×2 cm×0.5 cm) is held at the bottom of a Parr reactor by a weight (here a ring is used). The reactor pressure is set to vacuum for 30 minutes. An aqueous polymer dispersion is prepared comprising 20 percent by weight PRIMACOR™ 5980 (60% DoN with MEA, 8.4 pH, particle size of 74 nm) and 80 percent by weight water. An epoxy dispersion (OUDRASperse™ WB 3001 manufactured by The Dow Chemical Company) is prepared comprising 60 percent by weight dispersion solid and 40 percent by weight water. 80 ml of a dispersion comprising 67 percent by weight aqueous polymer dispersion and 33 percent by weight epoxy dispersion is introduced to the reactor. The reactor pressure is then set to 1.03 MPa for 60 minutes under nitrogen. The wafer is then placed in an oven and air dried at 60° C. for 48 hours, thereby providing a treated wafer. The treated wafer and the control wafer are each processed according to the E4-11 procedure. The percent swelling for the treated wafer is 1.1%; the WRE of the treated wafer is 76%. The hardness of the treated wafer is measured as 62.5 using a Type D Durometer.

Example 3

A pine wafer (southern yellow pine, 4 cm×2 cm×0.5 cm) is held at the bottom of a Parr reactor by a weight (here a ring is used). The reactor pressure is set to vacuum for 30 minutes. An aqueous polymer dispersion is prepared comprising 20 percent by weight PRIMACOR™ 5980 (60% DoN with MEA, 8.4 pH, particle size of 74 nm) and 80 percent by weight water. An epoxy liquid resin D.E.R. 324 manufactured by The Dow Chemical Company is mixed with the aqueous polymer dispersion at the weight ratio of 1 to 1. The D. E. R.™ 324 Liquid Epoxy Resin is a C12-C14 aliphatic glycidylether modified bisphenol A based liquid epoxy resin. 80 ml of a mixture comprising 50 percent by weight aqueous polymer dispersion and 50 percent by weight epoxy liquid resin is introduced to the reactor. The reactor pressure is then set to 1.03 MPa for 60 minutes under nitrogen. The wafer is then placed in an oven and air dried at 60° C. for 2 weeks, thereby providing a treated wafer. The treated wafer and the control wafer are each processed according to the E4-11 procedure. The percent swelling for the treated wafer is 0.45%; the WRE of the treated wafer is 90.38%. The hardness of the treated wafer is measured as 57.3 using a Type D Durometer.

Example 4

A pine wafer (southern yellow pine, 4 cm×2 cm×0.5 cm) is held at the bottom of a Parr reactor by a weight (here a ring is used). The reactor pressure is set to vacuum for 30 minutes. An aqueous polymer dispersion is prepared comprising 20 percent by weight PRIMACOR™ 5980 (60% DoN with KOH, 9.55 pH, particle size of 4.1 nm) and 80 percent by weight water. An epoxy liquid resin D.E.R. 324 manufactured by The Dow Chemical Company is mixed with the aqueous polymer dispersion at the weight ratio of 1 to 1. The D. E. R.™ 324 Liquid Epoxy Resin is a C12-C14 aliphatic glycidylether modified bisphenol A based liquid epoxy resin. 80 ml of a mixture comprising 50 percent by weight aqueous polymer dispersion and 50 percent by weight epoxy liquid resin is introduced to the reactor. The reactor pressure is then set to 1.03 MPa for 60 minutes under nitrogen. The wafer is then placed in an oven and air dried at 60° C. for 2 weeks, thereby providing a treated wafer. The treated wafer and the control wafer are each processed according to the E4-11 procedure. The percent swelling for the treated wafer is 1.2%; the WRE of the treated wafer is 74.04%. The hardness of the treated wafer is measured as 55.1 using a Type D Durometer.

Example 5

A pine wafer (southern yellow pine, 4 cm×2 cm×0.5 cm) is held at the bottom of a Parr reactor by a weight (here a ring is used). The reactor pressure is set to vacuum for 30 minutes. An aqueous polymer dispersion is prepared comprising 20 percent by weight PRIMACOR™ 5980 (100% DoN with NH3, 9.13 pH, particle size of 11 nm) and 80 percent by weight water. An epoxy liquid resin D.E.R. 324 manufactured by The Dow Chemical Company is mixed with the aqueous polymer dispersion at the weight ratio of 1 to 1. The D. E. R.™ 324 Liquid Epoxy Resin is a C12-C14 aliphatic glycidylether modified bisphenol A based liquid epoxy resin. 80 ml of a mixture comprising 50 percent by weight aqueous polymer dispersion and 50 percent by weight epoxy liquid resin is introduced to the reactor. The reactor pressure is then set to 1.03 MPa for 60 minutes under nitrogen. The wafer is then placed in an oven and air dried at 60° C. for 2 weeks, thereby providing a treated wafer. The treated wafer and the control wafer are each processed according to the E4-11 procedure. The percent swelling for the treated wafer is 0.58%; the WRE of the treated wafer is 87.74%. The hardness of the treated wafer is measured as 56.4 using a Type D Durometer.

Example 6

A pine wafer (southern yellow pine, 4 cm×2 cm×0.5 cm) is held at the bottom of a Parr reactor by a weight (here a ring is used). The reactor pressure is set to vacuum for 30 minutes. An aqueous polymer dispersion is prepared comprising 20 percent by weight PRIMACOR™ 5980 (60% DoN with MEA, 8.4 pH, particle size of 74 nm) and 80 percent by weight water. An epoxy liquid resin D.E.R. 736 manufactured by The Dow Chemical Company is mixed with the aqueous polymer dispersion at the weight ratio of 1 to 1. The D.E.R. 736 Epoxy Resin is a liquid reaction product of epichlorohydrin and dipropylene glycol. 80 ml of a mixture comprising 50 percent by weight aqueous polymer dispersion and 50 percent by weight epoxy liquid resin is introduced to the reactor. The reactor pressure is then set to 1.03 MPa for 60 minutes under nitrogen. The wafer is then placed in an oven and air dried at 60° C. for 2 weeks, thereby providing a treated wafer. The treated wafer and the control wafer are each processed according to the E4-11 procedure. The percent swelling for the treated wafer is 0.85%; the WRE of the treated wafer is 82.0%. The hardness of the treated wafer is measured as 56.3 using a Type D Durometer.

Example 7

A pine wafer (southern yellow pine, 4 cm×2 cm×0.5 cm) is held at the bottom of a Parr reactor by a weight (here a ring is used). The reactor pressure is set to vacuum for 30 minutes. An aqueous polymer dispersion is prepared comprising 20 percent by weight PRIMACOR™ 5980 (60% DoN with MEA, 8.4 pH, particle size of 74 nm) and 80 percent by weight water. An epoxy dispersion (OUDRASperse™ WB 3001 manufactured by The Dow Chemical Company) is prepared comprising 60 percent by weight dispersion solid and 40 percent by weight water. 80 ml of an epoxy dispersion is introduced to the reactor. The reactor pressure is then set to 1.03 MPa for 60 minutes under nitrogen. The wafer is then placed in an oven and air dried at 60° C. for 2 weeks. 80 ml of an aqueous polymer dispersion is introduced to the reactor. The reactor pressure is then set to 1.03 MPa for 60 minutes under nitrogen. The wafer is then placed in an oven and air dried at 60° C. for 2 days, thereby providing a treated wafer. The treated wafer and the control wafer are each processed according to the E4-11 procedure. The percent swelling for the treated wafer is 2.4%; the WRE of the treated wafer is 48.2%. The hardness of the treated wafer is measured as 53 using a Type D Durometer.

The Examples illustrate that when the cellulosic material contains the treating agent, including both the polymer and the modifying agent, favorable WRE results are obtained.

What is claimed is:

1. A method for preparing a treated cellulosic material comprising:
   (a) providing a cellulosic material;
   (b) a first treatment protocol comprising impregnating the cellulosic material with a modifying agent, the modifying agent comprising an epoxy resin; and
   (c) a second treatment protocol comprising impregnating the cellulosic material with an aqueous dispersion comprising a polymer, the polymer comprising an olefin-carboxylic acid copolymer,
   the first treatment protocol and the second treatment protocol being performed simultaneously such that the epoxy resin and the aqueous dispersion are premixed to prepare a treating agent dispersion.

2. The method of claim 1, wherein the impregnating of the first treatment protocol is conducted under pressure greater than or lower than ambient.

3. The method of claim 1, wherein the modifying agent comprises a polyglycidyl ether of polyhydric alcohol, polyglycidyl ether of polyhydric phenol, polyglycidyl amine, polyglycidyl amide, polyglycidyl imide, polyglycidyl hydantoin, polyglycidyl thioether, epoxidized fatty acid, epoxidized drying oil, epoxidized polyolefin, epoxidized di-unsaturated4 acid ester, epoxidized unsaturated polyester, or mixtures thereof.

4. The method of claim 1, wherein the olefin-carboxylic acid copolymer comprises, in polymerized form, a monomer selected from the group consisting of ethylene, propylene, 1-butene, 3-methyl-1-butene, 4-methyl-1-pentene, 3-methyl-1-pentene, 1-heptene, 1-hexene, 1-octene, 1-decene, 1-dodecene, butadiene, styrene, (meth)acrylic acid, maleic acid, maleic anhydride, or a mixture thereof.

5. The method of claim 1, wherein the olefin-carboxylic acid copolymer is a copolymer of an olefin monomer and comonomer having a polar group.

6. The method of claim 5, wherein the polar group is one or more of a carboxylic acid, carboxylic acid anhydride, carboxylic acid ester, carboxylic acid salt, or carboxylic acid amide.

7. The method of claim 1 wherein the olefin-carboxylic acid copolymer is an ethylene/acrylic acid (EAA) copolymer, ethylene/methacrylic acid copolymer (EMAA), or combination thereof.

8. The method of claim 1, wherein the first treatment protocol and the second treatment protocol are conducted by depositing the cellulosic material in a vessel and holding the vessel at vacuum prior to pressurizing the vessel to a pressure of 0.1 to 1.7 MPa.

9. The method of claim 8, wherein prior to pressurizing the vessel and after holding the vessel at vacuum, introducing the treating agent dispersion to the vessel.

* * * * *